Nov. 24, 1964  A. H. MENKE  3,158,191
SOLDERING IRON AND TORCH UNIT
Filed Oct. 31, 1962
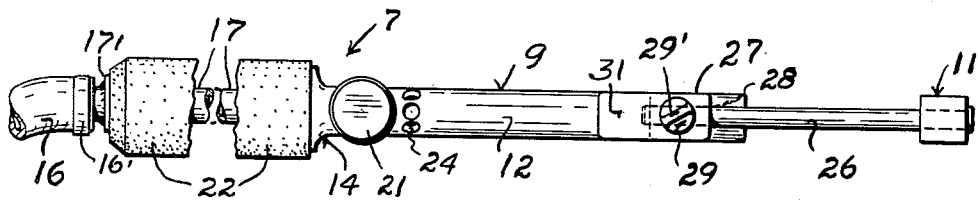
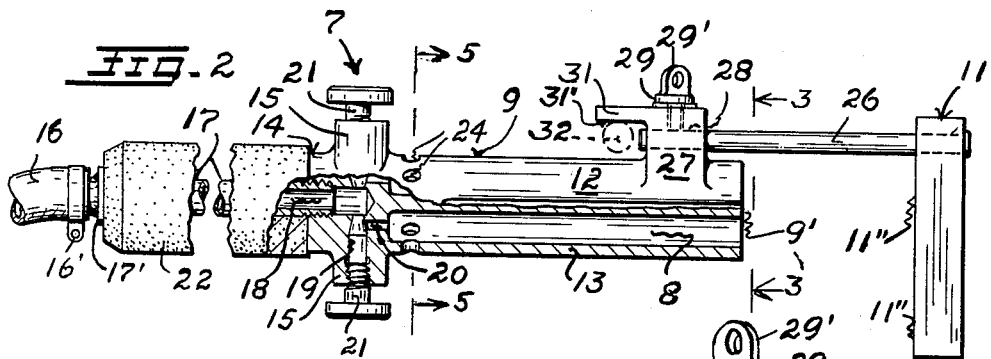
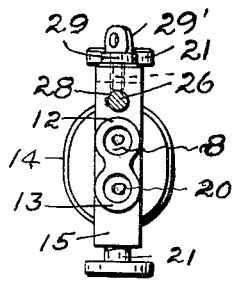
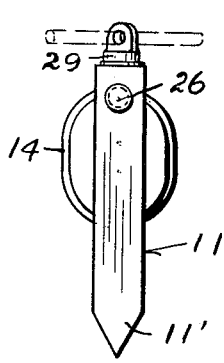
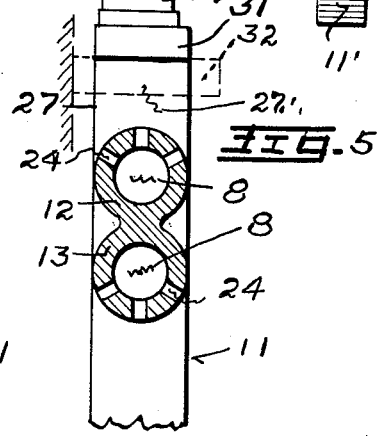
INVENTOR.
ADOLF H. MENKE
BY Henry N. Young
ATTORNEY

United States Patent Office 3,158,191
Patented Nov. 24, 1964

3,158,191
SOLDERING IRON AND TORCH UNIT
Adolf H. Menke, 435 23rd Ave., Oakland 6, Calif.
Filed Oct. 31, 1962, Ser. No. 234,292
7 Claims. (Cl. 158—26)

The invention relates to a unitary soldering tool comprising a gas-fueled torch for unitarily carrying a soldering-head element which is directly heatable to an adjusted degree by the application thereagainst of a gas-burning jet from the torch.

In the lateral heating of an elongated soldering head by a single heating jet, it is generally difficult to control the distribution of heat in the head for a most efficient functioning application of the head, and it is a present general object to more positively control the distribution of heat to such a torch-carried soldering head by providing and applying laterally thereagainst a plurality of mutually co-planar heating jets provided by a multi-nozzle burner of the utilized gaseous fuel.

A more specific object is to provide a unit in which the supply of fuel to the different heating jets of the torch is relatively adjustable while the unit is in use.

Another object is to provide a unit having a heating torch element provided with a dual mixing-nozzle structure which is of minimum width and minimum weight for its duty, while providing for a line distribution of the torch heat.

A further object is to provide a soldering iron of the present character having the soldering-head element removable to then permit various direct working applications of the heat of the torch jet or jets.

Yet another object is to provide the torch structure of the present character with means facilitating a fixed mounting of the same for its use with or without the soldering-head element.

The invention possesses other objects and features of advantage, some of which, with the foregoing, will be set forth or be apparent in the following description of a typical embodiment thereof, and in the accompanying drawings, in which, FIGURE 1 is an edge view of a tool embodying the present unit.

FIGURE 2 is a partly sectional side view of the tool of FIGURE 1.

FIGURE 3 is a view taken from the line 3—3 in FIGURE 2.

FIGURE 4 is a front-end view of the tool.

FIGURE 5 is an enlarged fragmentary view taken from the line 5—5 in FIGURE 2.

For carrying out the foregoing and other objects, the present invention provides certain structural and functional improvements over soldering tools of the type which provide for the mixing of a pressure-supplied combustible gas with combustion-supporting air within a mixing-chamber duct provided by a discharge nozzle portion of a torch body to provide a jet of the burning mixture which is directed against a soldering head or block mounted on the nozzle in spaced relation to the discharge end of the nozzle for its direct heating by the burning jet. In general terms, a present soldering tool essentially comprises a unitary torch structure 7 having a plurality of nozzle portions providing aerating ducts 8 for a gaseous fuel within a discharge nozzle portion 9 of a one-piece body to generally provide a combined planar heating jet which is coplanar with the longitudinal line of a nozzle-carried soldering block 11 against which the burning torch jet is directed.

Preferably, and as shown, the nozzle ducts or bores 8 are of like uniform diameter and length and are provided within laterally connected forward body portions 12 and 13 having like tubular and uniform cross-sections in tangentially related and laterally joined relation while extending integrally to a common planar end 9' from a rearward body portion 14 which is symmetrically related to the combined section of the nozzle portions 12 and 13 and provides cylindrical and mutually coaxial terminal bosses 15 extending laterally beyond the connected ends of the nozzle tubes 12 and 13 in a common line in the plane of the said nozzle tubes. Essentially, un-aerated gaseous fuel, as domestic gas, supplied under pressure from a suitable source represented by a flexible supply hose 16 and through a connecting nipple 17 threadedly connected with an axial fuel duct 18 of the rear body portion 14, is selectively or simultaneously deliverable from the receiving duct 18 to oppositely directed branch portions of a bore 19 extending longitudinally through the body portion 14 between the outer ends of the bosses 15, while intermediate branch ducts 20 extend forwardly and axially into the different ducts 8 of the nozzle portions 12 and 13 from the different portions of the bore 19.

It will now be noted that the outer ends of the body bores 19 threadedly, and substantially sealedly, receive the stems of needle valves 21 having conical inner point portions thereof cooperatively related to complementary seats provided at the inner ends of the bore 19 from which the ducts 20 intermediately and radially extend to their connections with the nozzle ducts 8. The outer ends of the valves 21 are provided with suitable heads for use in manually and axially adjusting the valve points with respect to the corresponding valve seats of the bores 19, whereby the rate of flow of fuel from the duct 18 to the different nozzle ducts 8 is independently adjustable between zero and full-flow values thereof in accordance with the pressure of the fuel supplied through the nipple 17 and the setting of the valves 21. As particularly indicated, the fuel-connection nipple 17 mounts a suitable tubular hand-grip member 22 which is clampedly engaged between the rearward end of the body and a flange 17' provided on the nipple adjacent, and forwardly of, a hose connection 16'.

For effecting a combustion-supporting aeration of the gaseous fuel in the torch ducts 8, the nozzle sections 12 and 13 are provided at their exposed exterior portions adjacent the rearward body portion 14 with circumferential lines of radial air-inlet ports 24 whereby pressure streams of gaseous fuel flowing axially into the nozzle ducts 8 from the ports 24 are arranged to provide an induction entrainment of atmospheric air for its mixing with the fuel in the ducts to condition the fuel for its combustion beyond the forward end of the nozzle portion 9 as a torch jet for its application to a nozzle-carried soldering block 11, or another object to be heated by the present torch assembly per se. For insuring a uniform aeration of the fuel within the nozzle sections 12 and 13, the air-inlet ports 24 for the nozzle ducts 8 are preferably evenly distributed peripherally of the exposed surfaces of the tubular nozzle body sections 12 and 13 providing them. As shown, the external cylinders of the like nozzle sections 12 and 13 are tangentially related and are laterally and integrally united at and by an integral fillet means connecting them adjacent their common line of tangency in a relation in which the present ports 24 are three in number and are evenly spaced seventy-two degrees apart about the cylindrical exteriors of the nozzle sections 12 and 13.

The present soldering head 11 comprises an elongated block of suitable heat-conducting material of uniform rectangular cross-section except at a wedge-shaped end portion 11' which represents any suitably-shaped application end for the head. The soldering block 11 is preferably at least as wide at its rearward face 11" as the torch nozzle portion 9 transversely of the nozzle plane, whereby to assure a maximum jet heating at said rear head face 11" from the utilized torch nozzle or nozzles. Adjacent the block end opposite its end 11', a carrying rod or stem 26 has one end thereof fixedly engaged in the block 11 to extend transversely from the block and in parallel relation to the apical line of its wedge end 11', and a means is provided for mountingly engaging the support stem 26 with the nozzle portion 9 of the present torch structure.

As particularly shown, an arm 27 extends integrally from the nozzle section 12 in the common plane of the nozzle sections, and is provided therethrough with a hole 28 parallel to the nozzle ducts 8 for slidably and complementarily receiving the free end of the rod 26 for its adjustable securing therein by the use of a set screw 29 arranged to engage the inserted rod in the nozzle plane. The present set screw 29 conveniently provides an axial turning-ear portion 29' which is provided with a hole for receiving a nail or the like for use as a capstan lever to insure a firmly clamped rotation-preventing engagement of the screw with the rod 26 in the hole 28, whereby to provide for the fixed adjusted spacing of the soldering block from the opposed nozzle end in the nozzle plane.

Recalling that the air-inlet port arrangement for the disclosed dual nozzle structure is essentially such as to provide for a maximum uniform spacing of the three air-inlet ports 24 about the external cylinders of the individual nozzles 12 and 13 at about ninety degrees apart in their line, it will be understood that the present mutually tangent relation of the bounding cylindrical exteriors of the present nozzle sections 12 and 13 may be utilized in a multi-nozzle assembly of three or more mutually coplanar jet-providing nozzles for providing a straight-line applicaton of heat against the block face 11' in the nozzle plane, in which case only the outer nozzles of the combination would provide the three ports 24 while the intermediate nozzle or nozzles would have only two of the ports of the showing of FIGURE 5.

Having the block 11 mounted on the nozzle portion in adjustably spaced relation to the discharge ends of the nozzle ducts 8 and generally in the common nozzle plane, it will be understood that the ignited gas and air mixture discharged toward the block from one or both of the nozzle sections 12 or 13 is arranged to provide a torch with respect to the mounted soldering block 11 for heating the block tip portion 11' by heat conduction through the block for a customary use of the block tip 11' as a heated solder-melting point which is disposed outside of the combustion zone of the heating torch flame and in a regulated manner cooperatively depending on the degrees of opening of the different gas-supply valves 21 and the adjusted spacing of the block 11 opposite the discharge end 9' of the nozzle. It will be understood that such a regulated heating of the soldering block 11 in the common plane of the torch jets and block comprises a particularly advantageous manner of utilizing the torch heat without subjecting the working zone adjacent the block tip to direct contact with the torch flame or the combustion products.

It will now be noted that the present soldering tool, comprising the torch assembly 7 and the block 11 mounted thereon, is arranged for its manual manipulation with respect to a fixedly disposed work point by a mechanic supporting the unit by the use of the hand grip 22 as a handle for the application of the block point 11' of the block tip to the work. Alternatively, the present unit may be fixedly mounted for the moving application of the work with respect to the heated block tip as by its fixed gripping between the jaws of a vise or the like, and is particularly adapted for such a mounting thereof by the use of the block-supporting arm 27. The present head-mounting arm 27 of the torch structure 7 is also provided with a means for use to hangingly support the torch structure 7, with or without the soldering block 11 mounted thereon, and said arm is accordingly provided with an ear 31 extending rearwardly from the outer end of the arm 27 and having its inner face 31' cooperative with the coterminous rearward arm face 27' to provide an angular space for receiving a horizontally-extending rod 32 or the like adapted for a hung-up support of the torch 7 thereon in suspended relation thereto, as is indicated in FIGURES 2 and 5.

From the foregoing description taken in connection with the accompanying drawings, the advantages of the present soldering unit will be readily understood by those skilled in the art to which the invention appertains. While I have shown and described a structure and arranged which I now consider to be a preferred embodiment of my invention, I desire to have it understood that the showings are primarily illustrative, and that such changes and developments may be made, when desired, as fall within the scope of the following claims:

I claim:

1. In a gas-fueled heating torch, a one-piece body providing a plurality of mutually coplanar straight and parallel fuel-aerating ducts adapted to discharge aerated fuel therefrom solely at a planar forward body end transverse to the duct plane, open air-inlet ports extending into said body to side point of said ducts adjacent and forwardly of the inlet ends of the ducts, means of the body providing a fuel-supply duct connecting the inlet ends of said fuel-aerating ducts, and a means intermediately connecting said supply duct of the body with an external source of the fuel under pressure whereby the flow of the fuel into said fuel-aerating ducts is operative to effect an aerating flow of air through said air-inlet ports into the different aerating ducts by induction whereby the ignition of the aerated fluid streams from the ducts beyond said forward body end is adapted to provide a combined planar heating jet thereat.

2. In a gas-fueled heating torch, a one-piece body providing a plurality of straight and parallel mutually coplanar fuel-aerating ducts of unrestricted cross-section therealong and terminating at a common planar forward body end transverse to the duct plane, open air inlet ports to said ducts provided in said body adjacent and forwardly of the inlet ends of said ducts, a gas-supply duct in said body having branches connected to the inlet ends of said fuel-aerating ducts, a means connecting the unbranched portion of said fuel-supply duct with an external source of fuel under pressure, and manually-settable body-mounted valves directly operative in the different branches of said supply duct for independently adjusting the rate of flow of the fuel into the different aerating ducts whereby to simultaneously induce a gas-aerating flow of air through said air inlet ports into the corresponding nozzle ducts in accordance with the degrees to which the valves in the branch supply duct are open to then provide combustible mixtures in the nozzle ducts for their burning in a common planar heating jet in the plane of the nozzle ducts and beyond said body end plane.

3. In a gas-fueled heating torch, a monolithic torch body having a nozzle portion providing mutually coplanar and parallel fuel-aerating ducts of uniform cross-section arranged for the discharge of aerated fuel solely from their discharge ends at a common end plane of the nozzle portion, open air inlet ports for said ducts provided in said body adjacent and forwardly of the inlet ends of said aerating ducts, means in the body providing a fuel-supply duct connecting the inlet ends of said fuel-aerating ducts, a means for intermediately connecting said supply duct of the body with a common external source of a gaseous fuel under pressure, and body-mounted valves operative in the different branches of said fuel-supply duct for independently adjusting the permitted flow of the gas from the supply duct to the different nozzle ducts whereby the flow of gas from said supply duct into said nozzle ducts is operative to effect a flow of fuel-aerating air through said ports into both nozzle ducts by induction and in accordance with the degree to which the valves in the branch supply ducts thereto are open, whereby the ignited aerated gas jointly discharged from adjacent said nozzle ducts is arranged to provide a planar and forwardly-directed heating jet for adjustably variable temperature across it beyond the end plane of discharge of the jets from the nozzles.

4. In a multi-jet gas-fueled heating torch, a monolithic body having a forward nozzle portion providing a plurality of mutually coplanar and parallel fuel-aerating ducts of uniform cross-section terminating at a common end plane transverse to the plane of the ducts, lateral open air inlet ports for said ducts formed in said body solely adjacent the inlet ends of said ducts radially of the ducts, means of a rearward body portion providing fuel-supply ducts for the inlet ends of said fuel-aerating ducts, independently adjustable body-mounted flow valves directly operative in said fuel-supply ducts, and a means connecting said supply ducts with a common external source of the gaseous fuel under pressure whereby the pressure flow of the fuel into said fuel-aerating ducts is operative to induce an aerating flow of air into and through the gas-receiving nozzle ducts for the ignition of the discharged aerated gas forwardly beyond the nozzle portion of the body to provide a projected planar heating jet of adjustably variable temperature across its width.

5. The combination of claim 4 having a body part extending laterally and integrally from a forward point of said nozzle portion of the body in the common plane of its fuel aerating ducts and integrally providing a rearward hook extension for use in suspendingly mounting the torch on a fixed support therefor.

6. The combination of claim 4 having a body part extending laterally and integrally from a forward point of said nozzle portion of the body and providing a uniform bore parallel to the fuel aerating ducts of the body, a support stem member slidably engaged in said bore of said body part in forwardly extending relation to said end plane of the nozzle portion of the torch body, a soldering block fixedly mounted on the forward end of said stem member, and a means of said body part cooperative with the stem member engaged in the bore thereof for fixedly disposing the stem-carried soldering block in the plane of the aerating ducts in adjustably spaced relation to the forward end of said nozzle portion of the torch.

7. In a gas-fueled soldering unit, a torch having a monolithic body providing a pair of mutually parallel and uniform fuel-aerating ducts discharging beyond a forward end plane of the body transverse to the plane of the ducts, means of the body providing lateral air inlet ports to said fuel-aerating ducts adjacent the receiving ends of the ducts, means of the body providing a common fuel-supply duct having branches connected with said fuel-aerating ducts at the receiving ends thereof, body-carried valves operative in the different branches of said supply duct and independently settable for adjusting the permitted flow of the fuel from the supply duct to the different nozzle ducts whereby a flow of the fuel into and through said fuel-aerating ducts is operative to effect an aerating flow of air into the fuel-aerating ducts by induction and in accordance with the degrees to which the valves in the branch supply ducts thereto are open, an elongated soldering block member, and means fixedly mounting said block member on the body in the plane of the aerating ducts and in adjustably spaced and parallel relation to the discharge plane of the aerating ducts for its heating by the duct-provided jet.

References Cited in the file of this patent
UNITED STATES PATENTS

| | | |
|---|---|---|
| 658,591 | Schlegel | Sept. 25, 1900 |
| 773,203 | Fosdick | Oct. 25, 1904 |
| 1,371,711 | Thompson | Mar. 15, 1921 |
| 1,455,648 | Morrison | May 15, 1923 |
| 1,528,046 | Butts | Mar. 3, 1925 |
| 1,561,968 | Burstyn | Nov. 17, 1925 |
| 1,831,819 | Menke | Nov. 17, 1931 |
| 2,393,480 | Schmidt | Jan. 22, 1946 |
| 2,627,905 | Mangieri | Feb. 10, 1953 |